(12) United States Patent
Murata et al.

(10) Patent No.: US 6,261,665 B1
(45) Date of Patent: Jul. 17, 2001

(54) ANTI-REFLECTION MATERIAL AND METHOD FOR PRODUCING THE SAME

(75) Inventors: Chikara Murata; Kazuya Ohishi; Yasuhiro Matsunaga; Kazuhiro Yamasaki; Yukinori Sakumoto, all of Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/140,431

(22) Filed: Aug. 26, 1998

(30) Foreign Application Priority Data

Sep. 16, 1997 (JP) .................................... 9-269286
Oct. 13, 1997 (JP) .................................... 9-294895

(51) Int. Cl.$^7$ .................................................... B32B 5/16
(52) U.S. Cl. ........................ 428/143; 428/147; 428/323; 428/327; 428/409; 428/913
(58) Field of Search .................... 428/323, 327, 428/143, 147, 409, 507, 913

(56) References Cited

U.S. PATENT DOCUMENTS

| | | | |
|---|---|---|---|
| 5,399,604 | * | 3/1995 | Sano et al. ............................ 524/356 |
| 5,510,428 | * | 4/1996 | Harano et al. ........................ 525/438 |
| 5,516,456 | * | 5/1996 | Shinohara et al. ............... 252/299.01 |
| 5,877,229 | * | 3/1999 | Janke et al. ............................ 522/31 |
| 5,919,555 | * | 7/1999 | Yasuda et al. ........................ 428/206 |
| 5,925,438 | * | 7/1999 | Ota et al. .............................. 428/141 |
| 5,976,297 | * | 11/1999 | Oka et al. ............................. 156/241 |
| 5,981,616 | * | 11/1999 | Yamamura et al. .................. 522/168 |
| 6,008,940 | * | 12/1999 | Michihata et al. ................... 359/483 |
| 6,074,741 | * | 6/2000 | Murata et al. ........................ 428/327 |

FOREIGN PATENT DOCUMENTS 06-273740 A 9/1994 (JP) .
09-236702 A 9/1997 (JP) .

OTHER PUBLICATIONS

Abstract of Japanese Publication No. 07168006 A dated Jul. 4, 1995.
Abstract of Japanese Publication No. 07092305 A dated Apr. 7, 1995.
Abstract of Japanese Publication No. 06016851 A dated Jan. 25, 1994.
Abstract of Japanese Publication No. 06018706A dated Jan. 28, 1994.
Abstract of Japanese Publication No. 08122501 A dated May 17, 1996.

* cited by examiner

*Primary Examiner*—H. Thi Le
(74) *Attorney, Agent, or Firm*—Scully, Scott, Murphy & Presser

(57) ABSTRACT

The present invention provides an anti-reflection material and a polarizing film which can exhibit excellent anti-reflection properties and can obtain a visible image without glittering and without reducing an image contrast while exhibiting an excellent wear resistance and chemical resistance, as well as, exhibiting an excellent stain resistance. A surface-roughened layer (12) is provided on one surface or double surfaces of a transparent substrate (11) directly or via another layer, and the surface-roughened layer (12) comprises an ultraviolet-curing resin comprising at least an epoxy compound and a photo-cationic polymerization initiator.

5 Claims, 2 Drawing Sheets

ANTI-REFLECTION MATERIAL AND METHOD FOR PRODUCING THE SAME

BACKGROUND OF THE INVENTION

The invention relates to anti-reflection materials advantageously used for display such as liquid crystal displays (LCD), plasma displays (PDP), CRT, EL and the like, specifically relates to anti-reflection materials having superior stain resistance on image displaying surfaces, anti-reflection property, chemical resistance and wear resistance. The invention also relates to a method for producing anti-reflection materials and polarizing film.

Displays typified by LCD, PDP, CRT and EL are widely used in various fields such as television and computer technologies, and have been rapidly developed. At the beginning of the development of displays, obtaining color images was a keyword for the development. Recently however, high vision color images has been one of keywords in the development of displays, so that more weight has been put on higher refinement and higher quality for images, and low electric power consumption. Displays supporting man-machine interface will be further widely used according to beginning of multimedia community. Especially, popularization of pocket telephones, PHS and other portable terminals will remarkably enlarges application of the above displays.

As displays for portable terminals, it is noted that liquid crystal displays, that are light, compact and suitable for wide use, may monopolize the market. Portable terminals containing touch-panel to which a plastic pen or a finger is directly contacts for operation have been widely used. Therefore, requirements for wear resistance, chemical resistance and stain resistance have become stricter than ever. Furthermore, requirements for anti-reflection, namely, preventing the outside lights such as sun light, fluorescent lamp, and the like from reflecting on a display when the display is used in the light such as outdoors has become stricter than ever. These requirements extend over not only portable terminals but also various types of displays from small sizes to large sizes.

With regard to materials for substrates used in anti-reflection materials, triacetyl cellulose (hereinafter referred to TAC) is usually used since that exhibits low in cost and excellent optical properties. However, TAC is very inferior in adhesiveness with water-type adhesive when TAC is laminated with a polarization substrate. In order to overcome the above defect, they have been improved adhesiveness between a TAC film and a polarization substrate layer by saponifying the TAC film after forming a surface-roughened layer thereon. However, such treatment changes optical properties of the surface-roughened layer such as HAZE value thereof and the like, thereby resulting in defect of image contrast and image unevenness, so that clear images can not formed. In addition, hardness and wear resistance of the surface-roughened layer decrease, so that hardness of a surface layer which is formed on the surface-roughened layer decrease, thereby decreasing wear resistance of the anti-reflection material. Alternatively, in the case that saponifying to TAC film is conducted after forming a surface layer on a surface-roughened layer, the surface layer is easily solved by alkaline, thereby resulting in the same problems as mentioned above. Therefore, improvements of surface-roughened layer free from the above problems are desired.

On the contrary, in the case that a surface-roughened layer is formed on a saponified TAC film which is saponified, adhesiveness between the saponified TAC film and the surface-roughened layer is too inferior for critical use, and hence, improvements of surface-roughened layer is a essential subject. Therefore, it has been desired to provide laminate structures consisting of polarization substrate, transparent substrate and surface-roughened layer, having excellent optical properties and wear resistance without the above-mentioned problems. The objective of the invention is to solve the above-mentioned problems and provide anti-reflection materials having excellent optical properties and good adhesiveness with transparent substrates and superior durableness.

With regard to anti-reflection, it has been generally applied to disperse or diffuse the light so as to graduate the image such as ground glass. In order to disperse or diffuse the light, an incidence surface of the light is essentially roughened. For surface roughening treatment, sandblast, embossing and the like that directly roughen a surface have been applied. Alternatively, it has been applied to provide a coating layer including a filler, or a porous layer on a surface of a substrate.

In the method providing a coating layer including a filler, the roughness of a surface-roughened layer can be easily controlled by selecting the particle size of the filler and the producing process thereof is simple, so that the method is preferably used. The resin used for the coating materials is preferably improved in transparency, heat resistance, wear resistance, chemical resistance and the like. As substrates are formed by plastic film that are high in transparency and low in heat resistance, UV-curing resins are preferably used. For example, Japanese Patent Unexamined Publication (Kokai) No. 1 (89)-105738 and No. 5(94)-162261 disclose structures including an UV-curing resin and a silica pigment.

However, silica pigment is high in oil absorptiveness, so that oil such as fingerprints is easily absorbed in the pigment in a surface roughened layer and the surface thereof is easily stained. Additionally, the stain can not be easily wiped off by using a cloth soaked with a solvent such as alcohol. Furthermore, the silica pigment sharply projects from the surface-roughened layer, so that fibers of the cloth cling to the ends of the silica pigment. As a result, the surface of the display becomes white, thereby deteriorating the image contrast thereof.

As another method for anti-reflection, it is noted that by alternatively coating a material with a high index of refraction and a material with a low index refraction (multi-coating), reflection on a surface can be restricted. The multi-coating layer is generally formed by sol-gel method or gaseous phase method which is alternatively coating a material with a low index of refraction typified by $SiO_2$ and a material with a high index of refraction such as TiO2, $ZrO_2$ or the like by means of deposition. It is proposed to form such multi-coating on the surface-roughened layer. However, such structure maintains the above mentioned problem that stain can not easily be wiped off. The reason is that the silica pigments sharply project from the surface-roughened layer, so that the shape of the surface layer of the multi-coating profiles the sharpened projection, whereby the roughness of the surface layer becomes sharp. As a result, the multi-coating maintains the above mentioned problem, and a part of the silica particles penetrate the surface layer, thereby easily absorbing oil such as fingerprints.

In addition, the gaseous phase method is not suitable for treatment for large area and high in apparatus expense. The sol-gel method is high in factory consumption since coating and baking must be repeated. Furthermore, the multi-coating formed by the sol-gel method is colored to violet or green type color, thereby showing the stain more remarkably than the surface-roughened layer without multi-coating. In order to prevent from staining, it is proposed to coat a flourine-type material on the surface-roughened layer. This proposal however can not solve the problem since the affect of the surface-roughened layer is still included.

According to higher resolution of displays, fineness of the height and the pitch of the roughness in the surface-roughened layer has been required. The higher refinement of images owes to higher density of dots of images. When the pitch of the roughness is larger than the pitch of the dots, glittering occurs due to interference. Therefore, in order to form clear images without reflection and glittering, it is critical to control the height and the pitch of the roughness in a restricted range without unevenness.

However, dispersion property of the surface roughed layer consisting of an UV-curing resin and a silica pigment is not sufficient. In addition, the surface-roughened layer before UV curing is liquid with low adhesive, so that the particles of the silica pigment adhere each other in the meantime from coating a coating material on a substrate to UV radiation, whereby coagulation (orange peel) is formed on the surface of the surface-roughened layer. Especially, coagulation becomes remarkable when the contain of silica pigment increases or the coating material for the surface-roughened layer is diluted by a solvent for controlling of the thickness thereof.

Therefore, another objective of the invention is to provide an anti-reflection material which exhibits excellent anti-reflection properties by means of preventing the outside lights such as sun light, fluorescent lamp, and the like from reflecting on a display, which gives clear images without glittering and reduction of image contrast, and, which exhibits excellent wear resistance, chemical resistance, optical stability and stain resistance. The objective of the invention is to provide a polarizing film manufactured by the above anti-reflection material, whereby remarkably improve properties of full color liquid crystal displays and the like.

SUMMARY OF THE INVENTION (1) Anti-reflection Material

The surface-roughened layer in the anti-reflection material according to the present invention comprises an ultraviolet-curing resin, which includes an epoxy type compound as a main agent and at least photo-cationic polymerization initiator as a polymerization initiator. In the case of the surface-roughened layer in the anti-reflection material according to the present invention, the photo-cationic polymerization initiator is an essential component. In order to control viscosity and crosslinking density of the ultraviolet-curing resin, and properties of a coating film and a coating material such as thermal resistance and chemical resistance, it is preferred that an acrylic compound is added. The comparative advantages in the case of using the ultraviolet-curing resin according to the present invention in the surface-roughened layer, compared with the case of using conventional radical-reaction-type of ultraviolet-curing resin are as follows:

(1) Since adhesion to a transparent substrate comprising a saponified TAC is excellent, and a surface-roughened layer can be formed on the pre-saponified TAC, the surface-roughened layer having excellent optical properties can be provided and productivity is good.

(2) There is a little oxygen inhibition.

(3) There is little curing-shrinkage.

(4) The dispensability of pigments is excellent.

In addition, a method for producing an anti-reflection material according to the present invention is characterized by providing a surface-roughened layer having the specific composition described above on one surface or double surfaces of a transparent substrate of a saponified TAC.

In the following, the preferred embodiments according to the present invention will be explained in detail.

A. Transparent Substrate

As the transparent substrate employed in the anti-reflection material according to the present invention, there can be mentioned a conventional transparent film, glass, or the like. For example, various resin films such as polyethylene terephthalate (PET), triacetyl cellulose (TAC), polyacrylate, polyimide, polyether, polycarbonate, polysulfone, polyether sulfone, cellophane, aromatic polyamide, polyethylene, polypropylene, polyvinyl alcohol, and the like, and glass base materials such as fused glass, soda glass, and the like can be preferably employed. For PDP and LCD, PET and TAC are preferred.

In addition, the transparent substrate employed in the anti-reflection material according to the present invention can be a saponified TAC in a form of sheet. The higher transparency of the transparent substrate is, the better the transparent substrate is. The light transmittance (JIS C-6714) is preferably 80% or more and more preferably 90% or more. It is desirable that the thickness of the transparent substrate be thin from the standpoint of light-weightness, and it is preferred that the transparent substrate having a thickness ranging from 1 $\mu$m to 500 $\mu$m, preferably from 50 $\mu$m to 200 $\mu$m, is employed by considering the productivity thereof. In addition, it is preferable that the transparent substrate is surface-treated by means of a corona treatment, plasma treatment, fluorine treatment, sputtering treatment, or the like, or coated by a surface active agent, a silane coupling agent, or the like. By virtue of such treatment, the surface energy of the transparent substrate increases and the adhesion strength between the transparent substrate and the surface-roughened layer can be certainly enhanced. More concretely, the transparent substrate has preferably a surface energy of 50 dyne/cm or more.

The higher transparency of the transparent substrate is, the better the transparent substrate is. The light transmittance (JIS C-6714) is preferably 80% or more and more preferably 90% or more. In the case where the transparent substrate is employed in a compact and light-weighting liquid-crystal display, the transparent substrate is preferably in a form of a film. It is desirable that the thickness of the transparent substrate be thin from the standpoint of light-weightness, and it is preferred that the transparent substrate having a thickness ranging from 1 $\mu$m to 500 $\mu$m, preferably from 50 $\mu$m to 200 $\mu$m, is employed by considering the productivity thereof.

In addition, the adhesion between the surface-roughened layer and the transparent substrate can be enhanced by means of a surface-treatment of the transparent substrate such as an alkaline treatment, corona treatment, plasma treatment, fluorine treatment, sputtering treatment, or the like, a coating, on the transparent substrate, of a surface active agent, a silane coupling agent, or the like, or a surface-modification-treatment such as an Si deposition or the like. In addition, on the surface of the transparent substrate, an anti-static layer may be formed in order to prevent stains such as dust statically adhered on a display surface. The anti-static layer can be formed by depositing or sputtering an extremely thin layer of a metal oxide such as ITO or a metal such as aluminum or tin, or by dispersing whiskers and metal microparticles such as aluminum or tin, whiskers and microparticles such as antimony-doped metal oxide such as tin oxide, fillerated charge-transfer complex produced between an electron donor such as an organic cation or a metal ion and 7,7,8,8-tetracyanoxydimethane in a polyester resin, an acrylic resin, an epoxy resin, or the like, and subsequently solvent-coating, or by solvent-coating a camphor-sulfonic-acid-doped polypyrrol, polyaniline, or the like. The light transmittance of the anti-static layer is preferably in 80% or more in the case of optical use.

B. Surface-roughened Layer

Next, the surface-roughened layer according to the present invention will be explained. The surface-roughened layer comprises an ultraviolet-curing resin, which includes an epoxy type compound as a main agent and at least photo-cationic polymerization initiator as a polymerization initiator.

As an example of said epoxy type compounds, there can be mentioned a glycidyl ether such as tetramethylene glycol diglycidyl ether, propylene glycol diglycidyl ether, neopentyl glycol diglycidyl ether, bisphenol A diglycidyl ether, or the like, an epoxy ester such as 2-hydroxy-3-phenoxypropyl acrylate, an adduct of bisphenol A-diepoxy-acrylic acid, or the like, as well as, a monomer and an oligomer such as an alicyclic epoxy represented by formulas as follows:

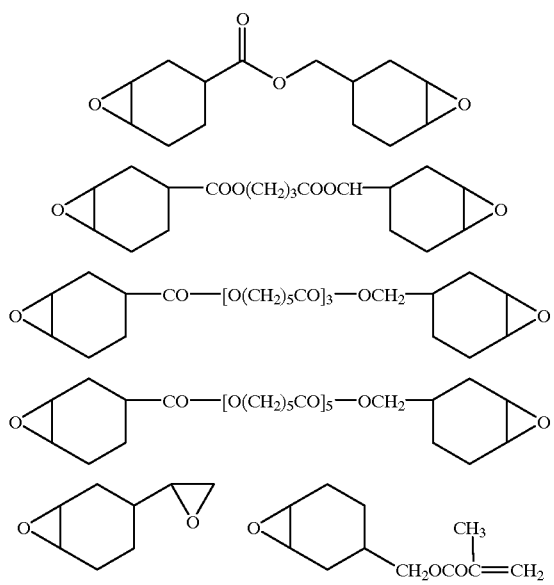

As a photo-cationic polymerization initiator, there can be mentioned compounds represented by the formulas as follows. These compounds can be employed alone or in a combination thereof.

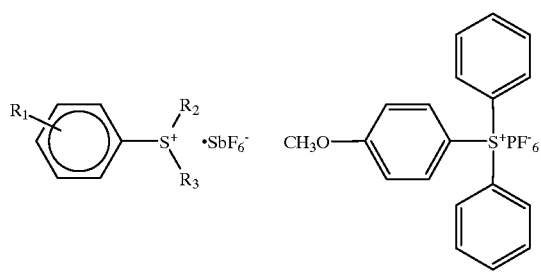

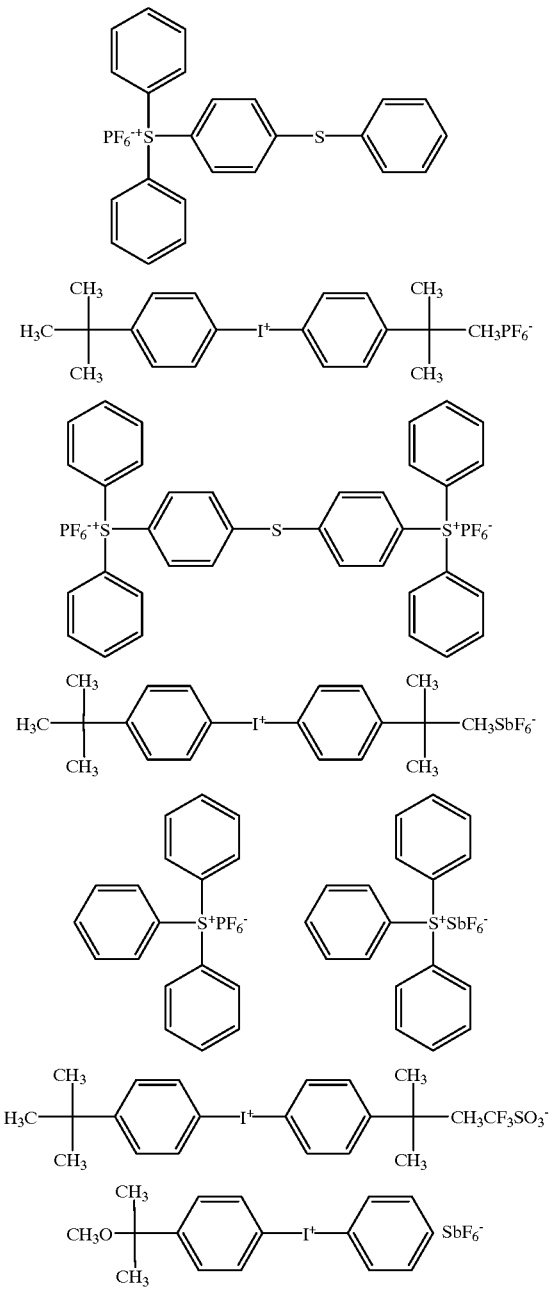

The photo-cationic polymerization initiators preferably employed in an amount of 0.1% by weight to 5.0% by weight based on the main agent. With less than 0.1% by weight or more than 5.0% by weight of the photo-cationic polymerization initiators, the ultraviolet curing is insufficient.

In the present invention, as described above, it is preferred that an epoxy type compound which is curable by ultraviolet is employed as a ultraviolet-curing resin and a photo-cationic-polymerization initiator is employed as a polymerization initiator. In this case, it is preferable that an acrylic compound which is curable by ultraviolet is mixed in order to control properties of a coating and a coating film such as viscosity, crosslinking density, thermal resistance, chemical resistance, and the like. As an example of such acrylic compounds, there can be mentioned an acrylic acid derivative such as a mono-functional acrylate such as lauryl acrylate, ethoxydiethylene glycol acrylate, methoxytriethylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxy acrylate, or the like, a multi-functional acrylate such as neopentyl glycol diacrylate, 1,6-hexanediol diacrylate, trimethylolpropane triacrylate, pentaerythritol triacrylate, pentaerythritol tetraacrylate, dipentaerythritol hexaacrylate, trimethylolpropane acrylic benzoate, or the like, a methacrylic acid derivative such as a mono-functional methacrylate such as 2-ethylhexyl methacrylate, n-stearyl methacrylate, cyclohexyl methacrylate, tetrahydrofurfuryl methacrylate, 2-hydroxyethyl methacrylate, 2-hydroxybutyl methacrylate, or the like, a multi-functional methacrylate such as 1,6-hexanediol dimethacrylate, trimethylolpropane trimethacrylate, glycerin dimethacrylate, or the like, a monomer and an oligomer such as an urethane acrylate such as glycerin dimethacrylate hexamethylene diisocyanate, pentaerythritol triacrylate hexamethylene diisocyanate, or the like.

The volumetric shrinkage ratio associated with curing of the surface-roughened layer employing said ultraviolet-curing resin (calculated by the following method) is preferably 20% or less. With 20% or more of the volumetric shrinkage ratio, in the case of a film-shaped transparent substrate, the film is extremely curled, and in the case of a rigid substrate such as a glass or the like, the adhesion between the substrate and the surface-roughened layer is reduced.

Volumetric shrinkage ratio: $D=(S-S')/S \times 100$ wherein S: specific gravity before curing S': specific gravity after curing (Specific gravity is measured by B method picnometer method of JIS K-7112.)

In the surface-roughened layer according to the present invention, a stabilizer (a thermal polymerization inhibitor) for the ultraviolet-curing resin such as hydroquinone, p-benzoquinone, t-butylhydroquinone, or the like may be added. It is preferred that the stabilizer is employed in a range of 0.1% by weight to 5.0% by weight with respect to the ultraviolet-curing resin.

It is preferable that the ultraviolet-curing resin employed in the surface-roughened layer have a higher transparency. The light permeability (JIS C-6714) is preferably 80% or more and more preferably 90% or more, in the case of the transparent substrate. The transparency of the anti-reflection material is affected by the refractive index of said ultraviolet-curing resin. The refractive index of said ultraviolet-curing resin is preferably in a range of 1.45 to 1.70, and more preferably in a range of 1.5 to 1.65. With the refractive index outside of the range described above, anti-reflection effects are degraded.

By virtue of containing a filler in the surface-roughened layer so as to surface-roughen the surface of the surface-roughened layer, the anti-reflection effects can be improved. As the filler, there can be mentioned an inorganic white pigment such as silica, calcium carbonate, aluminum hydroxide, magnesium hydroxide, clay, talc, titanium dioxide, or the like, or an organic transparent or white filler such as an acrylic resin, polystyrene resin, polyethylene resin, epoxy resin, silicone resin, or the like. In particular, an organic filler which is spheroidal and exhibits no oil-feedability is preferable. By means of employing spheroidal fillers, the projection parts projected from the surface of the surface-roughened layer is moderated, and stains such as oil do not adhere well, as well as, it is easy to wipe off adhered stains.

Such a filler has preferably a particle size D (JIS B9921) wherein the particles having a particle size D in a range of $0.5\ \mu m \leq D \leq 6.0\ \mu m$ are present in an amount of 60% by weight or more, particles having a particle size D in a range of $6.0\ \mu m < D \leq 10.0\ \mu m$ are present in an amount of less than 20% by weight, particles having a particle size D in a range of $10.0\ \mu m < D \leq 15.0\ \mu m$ are present in an amount of less than 5% by weight, and particles having a particle size D of larger than $15.0\ \mu m$ are present in an amount of 1.0% by weight or less. In addition, it is preferred that the particles having a particle size D of larger than $15\ \mu m$ are not present (0%), as possible. In particular, it is preferred that the particles having a particle size D in a range of $0.5\ \mu m \leq D \leq 6.0\ \mu m$ are present in an amount of 80% by weight or more, particles having a particle size D in a range of $6.0\ \mu m < D \leq 10.0\ \mu m$ are present in an amount of less than 10% by weight, and particles having a particle size D in a range of $10.0\ \mu m < D \leq 15.0\ \mu m$ are not present at all. In the case where a filler has a particle size D wherein the particles having a particle size D in a range of $0.5\ \mu m \leq D \leq 6.0\ \mu m$, particles having a particle size D in a range of $6.0\ \mu m < D \leq 10.0\ \mu m$, and particles having a particle size D in a range of $10.0\ \mu m < D \leq 15.0\ \mu m$ are present in an amount of less than 60% by weight, less than 20% by weight, and less than 5% by weight, respectively, anti-reflection effects of displays are degraded. On the other hand, in the case where a filler has a particle size D wherein the particles having a particle size D in a range of $6.0\ \mu m < D \leq 10.0\ \mu m$ are present in an amount of 20% by weight or more, or the particles having a particle size D in a range of $10.0\ \mu m < D \leq 15.0\ \mu m$ are present in an amount of 5% by weight, the image on the displays becomes glitter. The filler is preferably present in an amount of 0.5% to 30% in the total solid ratio of the surface-roughened layer. In particular, it is more preferably present in a range of 1% to 15%. With 0.5% or less of the filler, the sufficient anti-reflection effects cannot be obtained. On the other hand, with 30% or more of the filler, not only the transparency and the contrast of image are degraded, but also durability such as wear resistance, environmental resistance, or the like is impaired. In addition, the refractive index of the filler (B method according to JIS K-7142) is preferably equivalent to that of the curing resin. In the case where the refractive index of the filler is different from that of the curing resin, light is scattered in the interface of the resin and the filler, and therefore, the transparency is impaired. As an example of fillers having a refractive index equivalent to that of the curing resin, there can be mentioned organic fillers, and in particular crosslinking acryl beads.

As the crosslinking acryl beads, those consisting of polymers and copolymers obtained by means of polymerization such as suspension polymerization using an acrylic monomer such as acrylic acid and an ester thereof, methacrylic acid and an ester thereof, acrylic amide, acrylonitrile, or the like, a polymerization initiator such as persulfuric acid, or the like, and a crosslinking agent such as ethylene glycol dimethacrylate, or the like, is preferably employed. In particular, as an acrylic monomer, a monomer using methyl methacrylate is preferred. The crosslinking acrylic beads thus obtained are spheroidal and do not exhibit oil absorbing ability. For this reason, in the case where the beads are employed in the surface-roughened layer, excellent stain resistance can be exhibited.

In addition, the crosslinking acrylic beads may be surface-treated by fats and oils, a silane-coupling agent, an organic or inorganic material such as a metal oxide, or the like in order to improve dispensability of the coating material.

In the present invention, as a method for forming a surface-roughened layer, directly or via another layer, on one surface or double surfaces of the transparent substrate, there can be mentioned a method consisting of the steps of: mixing a filler such as crosslinking acrylic beads or the like, water, or an organic solvent in the UV-curing resin described above, as necessary; dispersing the mixture using a paint shaker, sand mill, peal mill, ball mill, attritor, roll mill, high-speed impeller disperser, jet mill, high-speed impact mill, ultrasonic disperser, or the like, to form a coating material or an ink; providing a mono-layer or multi-layers on one surface or double surfaces of the transparent substrate by means of a printing method such as a letterpress printing such as flexographic printing or the like, an intaglio printing such as direct gravure printing, offset gravure printing, or the like, a planographic printing such as offset printing or the like, a stencile printing such as screen process printing or the like, or a coating such as air doctor coating, blade coating, knife coating, reverse coating, transfer roll coating, gravure roll coating, kiss coating, cast coating, spray coating, slot orifice coating, calendar coating, electrodeposition coating, dip coating, die coating or the like; thermal-drying the coating or printing layers in the case where a solvent is included; and curing the coating or printing layers by means of UV radiation. UV radiation emitted from the light of extra-high pressure mercury vapor lamp, high pressure mercury vapor lamp, low pressure mercury vapor lamp, carbon arc lamp, xenon arc lamp, metal halide lamp, or the like can be employed.

In order to improve the coating aptitude or printing aptitude of a coating material and an ink, a rebelling agent such as silicone oil or the like, fats and oils such as polyethylene wax, carnauba wax, higher alcohol, bisamide, higher fatty acid, or the like, a curing agent such as isocyanate or the like, an additive such as ultra-microparticles having a particle size of 0.1 $\mu$m or less, such as calcium carbonate, silica sol, synthetic mica, or the like, can be employed, as necessary. In addition, in order to prevent stains such as dust adhered electrostatically to displays, an antistatic agent may be added. As the antistatic agent, the materials described in the antistatic layer can be employed.

The thickness of the surface-roughened layer is preferably in a range of 0.5 $\mu$m to 10 $\mu$m, and more preferably in a range of 1 $\mu$m to 5 $\mu$m. In the case where the thickness of the surface-roughened layer is less than 0.5 $\mu$m, wear resistance of the surface-roughened layer is degraded, or in the case of an UV-curing resin is employed in the surface-roughened layer, the resin fails to cure due to an oxidation inhibition. On the other hand, in the case where the thickness of the surface-roughened layer is more than 10 $\mu$m, curling occurs due to curing-shrinkage of the resin, microcracking occurs in the surface-roughened layer, or the adhesion between the transparent substrate and the surface-roughened layer is decreased.

C. Surface Layer

A surface layer is preferably formed on the surface-roughened layer. After conducting diligent research with regard to the properties of surface layers of anti-reflection materials in order to improve stain resistance of the display surface such as LCD, the present inventors discovered that there is an interrelation between a critical surface tension of the surface layer and the properties of the surface layer. As a result of quantitative analysis with regard to the interrelation, it was discovered that in the case where the critical surface tension of the surface layer of displays such as LCD is not more than 20 dyne/cm, for example, it is difficult for a stain caused by oil of fingers to adhere to displays, and even if such the stain is adhered thereto, it can be easily wiped off.

In the case where the critical surface tension is more than 20 dyne/cm, it is difficult for stains adhered on the surface layer to be wiped off. In addition, in order to improve anti-reflection effects, the refractive index of the surface layer is lower than that of the surface-roughened layer, and is preferably 1.45 or less. As a material having such characteristics, there can be mentioned, for example, an inorganic low-reflection material wherein an inorganic material such as LiF (refractive index: n=1.4), $MgF_2$ (n=1.4), $3NaF\cdot AlF_3$ (n=1.4), $AlF_3$ (n=1.4), $Na_3AlF_6$ (n=1.33), or the like is microgranulated, and the microgranules are contained in an acrylic resin or an epoxy resin, or an organic low-reflection material such as a silicone type organic compound, a fluorine type organic compound, a thermoplastic resin, a thermosetting resin, a radiation-curing resin, or the like. Inter alia, a fluorine-containing type fluorine material is particularly preferred in view of stain-preventing effects.

As the fluorine-containing material described above, there can be mentioned a fluorinated vinylidene type copolymer which can be dissolved in an organic solvent and is easy for treating, a fluoro-olefin/hydrocarbon olefin copolymer, a fluorine-containing epoxy resin, a fluorine-containing epoxy acrylate, a fluorine-containing silicone, a fluorine-containing alkoxysilane, as well as, TEFLON AF 1600 (produced by Dupont Inc., n=1.30), CYTOP (produced by Asahi Glass Corporation, n=1.34), 17 FM (produced by Mitsubishi Rayon Corporation, refractive index n=1.35), Opster JN-7212 (produced by Nihon Gosei Gum Corporation, n=1.40), LR 201 (produced by Nissan Chemical Industry Corporation, n=1.38), or the like. They may be employed alone or in combination thereof.

In addition, a radiation-curing-type fluorine-containing monomer, oligomer, prepolymer, or the like such as a fluorine-containing methacrylate such as 2-(perfluorodecyl) ethyl methacrylate, 2-(perfluoro-7-methyloctyl)ethyl methacrylate, 3-(perfluoro-7-methyloctyl)-2-hydroxypropyl methacrylate, 2-(perfluoro-9-methyldecyl) ethyl methacrylate, 3-(perfluoro-8-methyldecyl)-2-hydroxypropyl methacrylate, or the like, a fluorine-containing acrylate such as 3-perfluorooctyl-2-hydroxypropyl acrylate, 2-(perfluorodecyl)ethyl acrylate, 2-(perfluoro-9-methyldecyl)ethyl acrylate, or the like, an epoxide such as 3-perfluorodecyl-1,2-epoxy propane, 3-(perfluoro-9-methyldecyl)-1,2-epoxy propane, or the like, an epoxy acrylate, or the like can be employed. They can be employed alone or in combination thereof.

In addition, a low-reflection material obtained by mixing a fluorine-type film-forming agent and a sol wherein silica microparticles having a particle size of 5 nm to 30 nm are dispersed in water or an organic solvent can be employed. As the sol wherein silica microparticles having a particle size of 5 nm to 30 nm are dispersed in water or an organic solvent, a well-known silica sol obtained by means of condensation of an activated silicic acid known by a method for de-alkalization using an ion exchange of an alkali metal ion in an alkaline salt of silicic acid, or a method for neutralization of an alkaline salt of silicic acid with a mineral acid; a well-known silica sol obtained by means of hydrolysis and condensation of an alkoxysilane in an organic solvent in the presence of a basic catalyst; or an organic-solvent type silica sol (organosilica sol) obtained by replacing the water in an aqueous silica sol described above with an organic solvent by a distillation method may be employed. These silica sols can be employed in either an aqueous or organic-solvent condition. The silica sol contains a solid component as $SiO_2$ in a concentration of 0.5% by weight to 50% by weight.

Various types of silica ultra-microparticles in the silica sol such as in a spheroidal form, a needle form, a plate form, or the like can be employed.

In addition, as a film forming agent, an alkoxysilane, a metal alkoxide, a hydrolysate of metal salt, fluorine-modified polysiloxane, or the like can be employed. In particular, in order to set certainly the critical surface tension of the surface layer to not more than 20 dyne/cm, the film forming agent described above is preferably employed, and in particular, a fluorine compound is preferred. The surface layer according to the present invention can be obtained, for example, by diluting the materials described above with a solvent, providing the materials on the surface-roughened layer by means of a spin coater, a roll coater, a printing, or the like, drying the materials, and curing them by means of heat or radiation (in the case of UV radiation, a photo polymerization initiator is necessary). Although the radiation-curing type of fluorine-containing monomer, oligomer, and prepolymer are excellent in stain resistance, they may have disadvantages in that the surface layer is rejected on the surface-roughened layer in the case of some composition ratios, or the surface layer is peeled off from the surface-roughened layer, caused by bad wetting properties. For these reasons, it is preferred that the monomer, oligomer, and prepolymer of an acryloyl type or a methacryloyl type, or those including a polymerizable unsaturated bond such as an acryloyloxy group, methacryloyloxy group, or the like, described in the radiation-curing resin employed in the surface-roughened layer are mixed in an appropriate ratio and employed.

In the case where in the transparent substrate, a plastic film such as PET, TAC, or the like liable to be damaged by heat is employed, a radiation-curing resin is preferably selected as a material of the surface layer.

In order to improve the coating aptitude or printing aptitude of a coating material and an ink, a rebelling agent such as silicone oil or the like, fats and oils such as polyethylene wax, carnauba wax, higher alcohol, bisamide, higher fatty acid, or the like, a curing agent such as isocyanate or the like, an additive such as ultra-microparticles having a particle size of 0.05 μm or less, such as calcium carbonate, silica sol, synthetic mica, or the like, can be employed, as necessary, in the same manner as the surface-roughened layer. In addition, in order to prevent stains such as dust adhered electrostatically to displays, an antistatic agent may be added to the surface layer or an anti-electrostatic layer may be provided on the surface layer. As the antistatic agent, the materials described for the antistatic layer can be employed.

The thickness of the surface layer can be calculated according to a well-known expression. According to the well-known document (Science Library, Physics 9 "Optics", pp. 70 to 72), when incident light is incidented vertically to the surface layer, it is considered that the condition for which the surface layer does not reflect the light and the light is transmitted at 100% may be satisfied with the following relational expression. In the expression, "No" is represented by a refractive index of the surface layer, Ns is represented by a refractive index of the surface-roughened layer, h is represented by a thickness of the surface layer, and $\lambda_0$ is represented by a wave length of the light.

$$N_0 = N_s^{1/2} \ldots \text{Expression} \quad (1)$$

$$N_0 h = \lambda_0 / 4 \ldots \text{Expression} \quad (2)$$

According to Expression (1), it can be seen that in order to prevent the light reflection completely (100%), a material wherein the refractive index of the surface layer corresponds to a square root of the refractive index of the lower layer (surface-roughened layer) may be selected. In fact, it is difficult to find a material that satisfies the expression completely, and therefore, a material which has properties very near to those of a material that satisfies the expression completely is used. In expression (2), the optimum thickness as an anti-reflection film of the surface layer can be calculated from the refractive index of the surface layer selected according to expression (1) and the wave length of the light. For example, in the case where the refractive index of the surface-roughened layer and that of the surface layer are 1.50 and 1.38, respectively, and the wave length of the light is 550 nm, an optical film thickness of the surface layer is calculated as approximately 0.1 μm, and preferably in a range of 0.1±0.01 μm, according to expression (2).

The HAZE value according to JIS K7105 of the thus-obtained anti-reflection material according to the present invention is preferably in a range of 3 to 30, and more preferably in a range of 5 to 15. With the HAZE value of less than 3, the light scattering effects are small, and therefore, sufficient anti-reflection effects cannot be obtained. On the other hand, with the HAZE value of more than 30, the image contrast is degraded and visibility becomes bad, and for these reasons, it is not preferred since depression as a display is caused. The HAZE value means a clouding value, and is calculated according to the following expression by measuring a nnous diffuse transmittance (Hd %) and a total light transmittance (Ht %) using an integrating sphere type light transmittance measuring apparatus.

HAZE value=Hd/Ht×100

(2) Polarizing Film

A. Polarization Substrate

A polarizing film can be obtained by providing an anti-reflection material having the composition described above on one surface of the polarization substrate. The polarization substrate consists of a material which can form a transparent film, and as the material, for example, polyvinyl alcohol, polyvinylene, or the like can be employed. Such a material is drawn to form a film, thus obtaining a polarization substrate. For example, it is preferred that a polyvinyl alcohol (PVA) film obtained by uniaxially drawing a polyvinyl alcohol to which iodine or a dye is adsorbed as dichroism elements is employed. A polarization substrate having a thickness of 10 μm to 80 μm may be employed. More specifically, it is preferred that a PVA film is drawn in a uniaxial direction approximately three or four times, subsequently the drawn PVA film is immersed into a high-order iodide ion to obtain a polarization substrate.

B. Protecting Material

Since the PVA film obtained above has disadvantages in that it is liable to be torn and the shrinking ratio is large with regard to humidity change, due to an impaired strength, on one surface of the polarization substrate, a protecting material is laminated. Also the transparent substrate of the anti-reflection material is laminated on one surface of the polarization substrate so as to function similarly as the protecting material. In addition, the protecting material and the anti-reflection material are laminated severally on both surfaces of the polarization substrate. The protecting material and the transparent substrate are adhered to the surface of the polarization substrate using a polyester type adhesive, a polyacrylic type adhesive, a polyurethane type adhesive, a polyvinyl acetate type adhesive, or the like.

As the transparent substrate employed as the protecting material, a film of a transparent polymer compound such as a cellulose type film such as triacetyl cellulose, a polyester film, a polycarbonate film, or the like is employed. Inter alia, triacetyl cellulose is in particular preferred. The film thickness is preferably in a range of 10 to 2000 µm. In addition, it is preferred to improve the water resistance of the film by means of employing a gelling agent such as boric acid or the like, by means of a heat treatment, or by means of a formalization. In addition, in order to improve the adhesion between the polarization substrate and the film, it is preferred that a surface treatment such as a saponification treatment, a corona treatment, or the like be carried out so that the surface energy of the adhesion face with the polarization substrate is 50 dyne/cm or more.

DETAILED DESCRIPTION OF THE PREFERRED EMBODIMENTS

An anti-reflection material and a polarizing film according to the invention will be explained in detail referring to the accompanied drawings.

Figure 1:
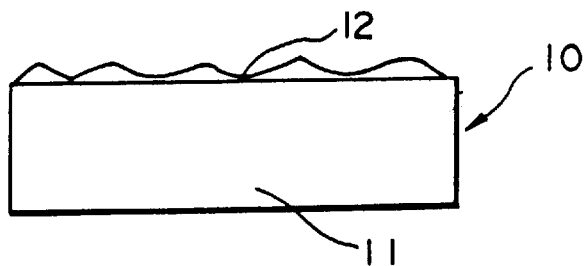
FIG. 1 is a schematic cross-section showing a structure of an anti-reflection material according to the present invention.

FIG. 1 shows a schematic cross section of an anti-reflection material. The anti-reflection material 10 consists of a transparent substrate 11 and a surface-roughened layer 12 formed on a surface thereof. A low refraction layer (surface layer) is formed on the surface-roughened layer 12. The low refraction layer is not shown since the layer is very thin (hereafter the same manner).

Figure 2:
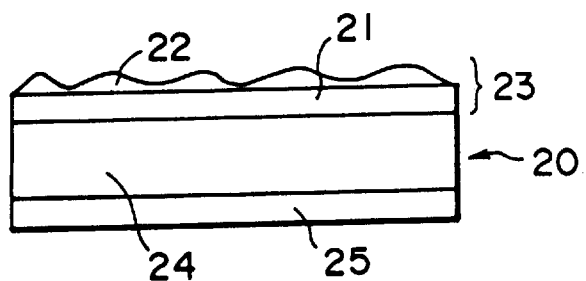
FIG. 2 is a schematic cross-section showing a structure of a polarizing film employing an anti-reflection material according to the present invention.

FIG. 2 shows a schematic cross section of a polarizing film 20 according to the invention. In the polarizing film 20, an anti-reflection film 23 consists of a transparent substrate 21 and a surface-roughened layer 22 is laminated on a surface of a polarization substrate 24. A protection film 25 is laminated on another surface of the polarization substrate 24.

Figure 3:
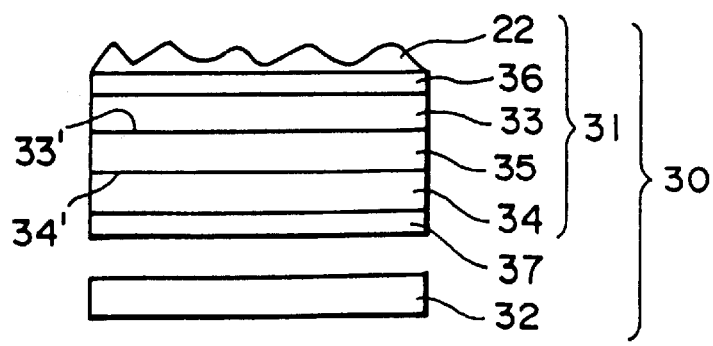
FIG. 3 is a schematic cross-section showing a structure of a liquid crystal display equipped with a polarizing film employing an anti-reflection material.

FIG. 3 shows a liquid crystal display 30 having improved anti-reflection properties due to an anti-reflection material according to the invention. The liquid crystal display 30 is manufactured by disposing a liquid crystal panel 31 above a back light 32 including a light guide plate (EL) and a lamp and the like. A twisted nematic (TN) liquid crystal cell can be used in the liquid crystal panel 31.

In the TN liquid crystal cell, alignment layers are formed by coating a polyimide solution on transparent electrodes 33' and 34' of a pair of glass substrates 33 and 34. The alignment layers are aligned by rubbing treatment. Then, a nematic liquid crystal 35 is filled between the glass substrate 33 and 34 and sealed therein by adhering the circumference of the glass substrate 33 and 34 with a epoxy resin. The nematic liquid crystal 35 is aligned with a twist angle of 90° by virtue of the alignment layer. A polarizing film 37 without surface-roughened layer is adhered to the back light side of the glass substrates 33 and 34. A polarizing film 36 consisting of the protection film 25, the anti-reflection material 23 and the polarizing film 24 held therebetween is adhered to the opposite side of the grass substrates 33 and 34. The polarizing films 36 and 37 are disposed so as to twist the polarization angles thereof with 90°, whereby the liquid crystal panel 31 is formed.

When a driving signal is applied to transparent electrodes of the TN liquid crystal panel 31, an electric field occurs between the electrodes. Then, the long axis of the molecular of the liquid crystal becomes parallel to the direction of the electric field by virtue of electric anisotropic of the molecular of the liquid crystal. As a result, the light does not transmit the liquid crystal panel. The contrast due to difference of the light transmittance is recognized as a visual information. In the liquid crystal display 30, contrasting between the portions where the light transmits or does not transmit forms images.

Figure 4:
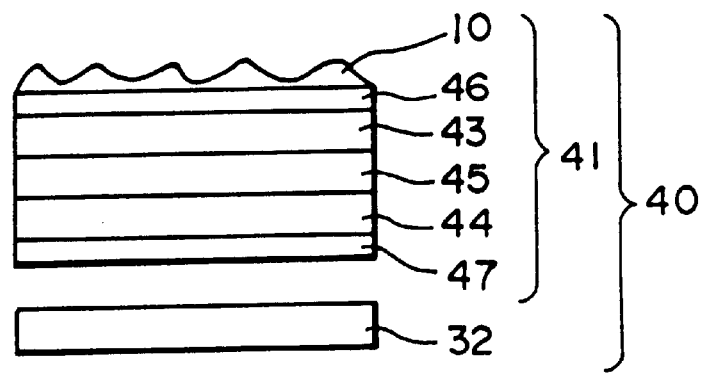
FIG. 4 is a schematic cross-section showing a structure of another liquid crystal display equipped with a polarizing film employing an anti-reflection material.

FIG. 4 shows a cross section of another liquid crystal display using the anti-reflection material 10. The liquid crystal panel 41 consists of; a pair of glass substrate 43 and 44; a nematic liquid crystal 45 held therebetween; an upper polarizing film 46 which is adhered to the glass substrate 43 and has no surface-roughened layer; a lower polarizing film 47 which has no surface-roughened layer; and an anti-reflection material 10 which is laminated on the polarizing film 46. The liquid crystal display 40 is formed by disposing the liquid crystal panel 41 above a back light 32.

EXAMPLES

The characteristics according to the present invention will be explained with Examples. In the following, "parts" refer to "parts by weight".

Example 1

At first, a dispersion liquid described below obtained by dispersing a mixture of cross-linking acrylic beads and toluene using a sand mill for 30 minutes, and a base coating material described below was mixed by being stirred for 15 minutes with a disper. The mixed coating material was coated on one surface of triacetyl cellulose film (trade name: Fuji Tack UVD 80, produced by Fuji Film Corporation, refractive index 1.49) which is a transparent substrate having a film thickness of 80 µm and a light transmittance of 92%, by means of a reverse coating method, and subsequently dried for 2 minutes at 100° C. Subsequently, the film was radiated by UV radiation to cure the coating film, under the conditions of radiation distance (distance between the center of the lamp and the coating face): 10 cm, treatment speed (speed with respect to the mercury lamp at the coating substrate): 5 m/min, using one condensing type high-pressure mercury lamp (120 w/cm). In this manner, a surface-roughened layer having a thickness of 1.7 µm and a refractive index of 1.53 was formed. Subsequently, a fluorine-containing silica sol (produced by Nissan Chemical Industry Corporation, LR 201 (total solid concentration: 4%, solvent: ethanol/butylcersorb=50/50)) was coated on said surface-roughened layer by means of spin coating. The coating was dried for one minute at 100° C., and heat-cured for 6 hours at 120° C., thus producing a surface layer having a thickness of 0.1 µm, a refractive index of 1.38, and a critical surface tension of 11 dyne/cm. As a result, an anti-reflection material according to the present invention having a HAZE value of 11 and a reflectance of 1.4% was obtained.

| [Composition of the dispersion liquid] | |
|---|---|
| Crosslinking acrylic beads (Polymethyl methacrylate) (Trade name: MX 150, particle size 1.5 ± 0.5 μm, produced by Soken Chemical & Engineering Co., Ltd.) | 9 parts |
| Toluene | 210 parts |
| [Composition of the base coating material] | |
| Acrylic type compound | |
| Dipentaerythritol triacrylate | 45 parts |
| Epoxy type compound (Trade name: Celloxide 2021, Daicel Chemical Industries, Ltd.) | 45 parts |
| Photo-cationic polymerization initiator represented by the following formula: | 2 parts |

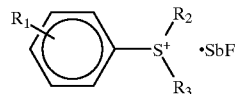

| Isopropyl alcohol | 5 parts |

Example 2

An anti-reflection material according to the present invention was obtained in a manner similar to that of Example 1, with the exception that the composition of the surface-roughened layer was replaced with the following composition. The thickness and refractive index of the surface-roughened layer were 3.8 μm and 1.52, respectively, the critical surface tension of the surface layer was 11 dyne/cm, and the HAZE value and reflectance of the anti-reflection material were 22 and 1.3%, respectively.

| [Composition of the dispersion liquid] | |
|---|---|
| Crosslinking acrylic beads (Polymethyl methacrylate) (Trade name: MX 300, particle size 3.0 ± 0.5 μm, refractive index 1.50, produced by Soken Chemical & Engineering Co., Ltd.) | 4 parts |
| Crosslinking acrylic beads (Polymethyl methacrylate) (Trade name: MX 500, particle size 5.0 ± 0.5 μm, refractive index 1.50, produced by Soken Chemical & Engineering Co., Ltd.) | 4 parts |
| Toluene | 200 parts |
| [Composition of the base coating material] | |
| Acrylic type compound | |
| Tripentaerythritol polyacrylate | 45 parts |
| Epoxy type compound (Trade name: Cyracure UVR-6110, produced by Union Carbide Corp.) | 45 parts |
| Photo-cationic polymerization initiator (Trade name: Cyracure UVI-6990, produced by Union Carbide Corp.) | 2 parts |
| Isopropyl alcohol | 5 parts |

Example 3

An anti-reflection material according to the present invention was obtained in a manner similar to that of Example 1, with the exception that the compositions of the base coating material and dispersion liquid of the surface-roughened layer were replaced with the following compositions. The thickness and refractive index of the surface-roughened layer were 2.8 μm and 1.55, respectively, the critical surface tension of the surface layer was 11.0 dyne/cm, and the HAZE value and reflectance of the anti-reflection material were 22 and 1.3%, respectively.

| [Composition of the dispersion liquid] Spheroidal silica | |
|---|---|
| (Trade name: Hipresica FQ, particle size 1.0 ± 0.1 μm, refractive index 1.45, produced by Ube Nittoh Kasei Corporation) | 3 parts |
| (Trade name: Hipresica UF, particle size 2.5 ± 0.1 μm, refractive index 1.43, produced by Ube Nittoh Kasei Corporation) | 4 parts |
| Crosslinking acrylic beads (Trade name: MX 300, particle size 3.0 ± 0.5 μm, refractive index 1.50, produced by Soken Chemical & Engineering Co., Ltd.) | 2 parts |
| Toluene | 210 parts |
| [Composition of the base coating material] | |
| Acrylic type compound | |
| Tetrapentaerythritol polyacrylate | 15 parts |
| Neopentyl glycol diacrylate | 30 parts |
| Epoxy type compound (Trade name: Epikote 828, produced by Yuka Shell Epoxy, Inc.) | 45 parts |
| Photo-cationic polymerization initiator (Trade name: Cyracure UVI-6990, produced by Union Carbide Corp.) | 2 parts |
| Isopropyl alcohol | 5 parts |

Example 4

On a surface-roughened layer produced in the same manner as described in Example 1, a fluorine-containing heat-curing resin, Opster JN-7212 (total solid concentration 5%, solvent MIBK, produced by Nihon Gosei Gum Corporation) was coated by means of spin coating. The coating was dried for 1 minute at 100° C., and subsequently, heat-cured for 2 hours at 100° C., thus producing an anti-reflection material according to the present invention having a HAZE value of 11 and reflectance of 1.6% with a surface layer having a thickness of 0.1 μm, refractive index of 1.40, and a critical surface tension of 18 dyne/cm.

Example 5

A surface-roughened layer was formed in a manner similar to that of Example 1, with the exception that the compositions of the base coating material and dispersion liquid were replaced with the following compositions. On the surface-roughened layer, a fluorine-containing heat-curing resin, Opster TM007 (total solid concentration 5%, solvent MIBK, produced by Nihon Gosei Gum Corporation) was coated. The coating was dried for 1 minute at 100° C. Subsequently, the film was radiated by UV radiation to cure the coating film, under the conditions of radiation distance (distance between the center of the lamp and the coating face): 10 cm, treatment speed (speed with respect to the mercury lamp at the coating substrate): 5 m/min, using one condensing type high-pressure mercury lamp. In this manner, an anti-reflection material according to the present invention comprising a surface layer having a thickness of 0.1 μm, a refractive index of 1.41, and a critical surface tension of 15 dyne/cm was formed. The surface-roughened layer had a thickness of 5.6 μm and a refractive index of 1.51, and the anti-reflection material had a HAZE value of 28 and a reflectance of 1.0%.

[Composition of the dispersion liquid]
Crosslinking acrylic beads

| | |
|---|---|
| (Trade name: MX 150, particle size 1.5 ± 0.5 μm; refractive index 1.50, produced by Soken Chemical & Engineering Co., Ltd.) | 10 parts |
| (Trade name: MX 300, particle size 3.0 ± 0.5 μm, refractive index 1.50, produced by Soken Chemical & Engineering Co., Ltd.) | 4 parts |
| (Trade name: MX 500, particle size 5.0 ± 0.5 μm, refractive index 1.50, produced by Soken Chemical & Engineering Co., Ltd.) | 2 parts |

Spheroidal silica

| | |
|---|---|
| (Trade name: Hipresica UF, particle size 6.5 ± 0.1 μm, refractive index 1.43, produced by Ube Nittoh Kasei Corporation) | 1 part |
| Toluene | 200 parts |

[Composition of the base coating material]
Acrylic type compound

| | |
|---|---|
| Pentaerythritol triacrylate hexamethylene diisocyanate | 45 parts |
| Epoxy type compound Bisphenol A diglycidyl ether | 45 parts |
| Photo-cationic polymerization initiator (Trade name: MPI 03, produced by Midori Kagaku Co., Ltd.) | 3 parts |
| Photo polymerization initiator (Trade name: Irgacure 184, produced by CIBA-GEIGY AG.) | 2 parts |
| Isopropyl alcohol | 10 parts |

Example 6

A coating material prepared by mixing a dispersion liquid and a base coating material having compositions described below, in the same manner as described in Example 1, was coated on one surface of a transparent substrate of polyethylene terephthalate film having a thickness of 75 μm and 89% of light transmittance, by means of a reverse coating method. Subsequently, the same procedures as described in Example 1 were carried out to obtain an anti-reflection material according to the present invention. The thickness and the refractive index of the surface-roughened layer were 2.5 μm and 1.51, respectively. The critical surface tension of the surface layer was 11 dyne/cm. The HAZE value and reflectance of the anti-reflection material were 9 and 1.4%, respectively.

[Composition of the dispersion liquid]

| | |
|---|---|
| Crosslinking acrylic beads (Trade name: MX 300, particle size 3.0 ± 0.5 μm, produced by Soken Chemical & Engineering Co., Ltd.) | 3 parts |
| Toluene | 210 parts |

[Composition of the base coating material]
Acrylic type compound

| | |
|---|---|
| 1,6-Hexanediol dimethacrylate | 20 parts |
| Pentaerythritol triacrylate hexamethylene diisocyanate | 30 parts |
| Epoxy type compound (Trade name: Epolight 40E, produced by Kyoei Chemical Corporation) | 45 parts |
| Photo-cationic polymerization initiator (Trade name MP103, produced by Midori Kagaku Co., Ltd.) | 2 parts |
| Isopropyl alcohol | 5 parts |

Example 7

An anti-reflection material was obtained in a manner similar to that of Example 1, with the exception that the kind of the acrylic beads and the amount thereof for the surface-roughened layer were replaced as shown in the following. The thickness and the refractive index of the surface-roughened layer were 3.0 μm and 1.53, respectively. The anti-reflection material had a HAZE value of 35, and a reflectance of 0.9%. The critical surface tension of the surface layer was 22 dyne/cm.

| | |
|---|---|
| Crosslinking acrylic beads (Trade name: MX 300, particle size 3.0 ± 0.5 μm, produced by Soken Chemical & Engineering Co., Ltd.) | 20 parts |

Example 8

An anti-reflection material having a critical surface tension of a surface layer of 42 dyne/cm was obtained in a manner similar to that of Example 1, with the exception that the coating material for the surface layer having the following composition was employed. The HAZE value and reflectance of the anti-reflection material were 11 and 1.3%, repectively.

[Composition of coating material for the surface layer]

| | |
|---|---|
| Silica sol (Ethanol dispersion liquid containing 30% by weight of silica ultra-microparticles as SiO2 having a particle size of 15 nm) | 10 parts |
| Film forming agent (Solid concentration 6%, calculated as a hydrolysate of tetraethoxysilane, $SiO_2$) | 15 parts |
| Solvent Ethanol | 53 parts |

Example 9

At first, a dispersion liquid described below obtained by dispersing a mixture of cross-linking acrylic beads and toluene using a sand mill for 30 minutes, and a base coating material described below was mixed by being stirred for 15 minutes with a disper. The mixed coating material was coated on one surface of a saponified TAC which is a transparent substrate having a film thickness of 80 μm and a light transmittance of 92%, by means of a reverse coating method, and subsequently dried for 2 minutes at 100° C. Subsequently, the film was radiated by UV radiation to cure the coating film, under the conditions of radiation distance (distance between the center of the lamp and the coating face): 10 cm, treatment speed (speed with respect to the mercury lamp at the coating substrate): 5 m/min, using one condensing-type high-pressure mercury lamp (120 w/cm). In this manner, a surface-roughened layer having a thickness of 2.5 μm and a refractive index of 1.53 was formed. Subsequently, a coating material for a surface layer having a composition described in the following was coated on the surface-roughened layer by means of a reverse gravure coating. The coating was dried and cured for 6 hours at 120° C., thus producing an anti-reflection material according to the present invention with a surface layer having a thickness of 0.1 μm. The critical surface tension of the surface layer was 40 dyne/cm. The HAZE value and reflectance of the anti-reflection material were 10 and 1.4%, respectively.

[Composition of the dispersion liquid]

| | |
|---|---|
| Crosslinking acrylic beads | 9 parts |
| (Trade name: MX 150, particle size 1.5 ± 0.5 μm, produced by Soken Chemical & Engineering Co., Ltd.) | |
| Toluene | 210 parts |

[Composition of the base coating material]

| | |
|---|---|
| Acrylic type compound | 45 parts |
| Dipentaerythritol triacrylate | |
| Epoxy type compound | 45 parts |
| (Trade name: Celloxide 2021, Daicel Chemical Industries, Ltd.) | |
| Photo-cationic polymerization initiator represented by the following formula: | 2 parts |

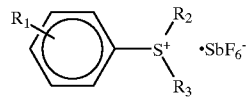

| | |
|---|---|
| Isopropyl alcohol | 5 parts |

[Composition of the coating material for surface layer]

| | |
|---|---|
| Silica sol | 10 parts |
| (Ethanol dispersion liquid containing 30% by weight of silica particles as SiO2 having a particle size of 15 nm) | |
| Film forming agent | 15 parts |
| (Solid concentration 6%, calculated as a hydrolysate of tetraethoxysilane, SiO2) | |
| Solvent | 53 parts |
| Ethanol | |

Example 10

An anti-reflection material according to the present invention having a surface-roughened layer with a thickness of 3.6 μm and refractive index of 1.53 was obtained in a manner similar to that of Example 9, with the exception that the composition of the surface-roughened layer was replaced with the following composition. The critical surface tension of the surface layer was 41 dyne/cm. The anti-reflection material had a HAZE value of 20 and a reflectance of 1.2%.

[Composition of the dispersion liquid]

| | |
|---|---|
| Crosslinking acrylic beads | 14 parts |
| (Trade name: MX 300, particle size 3.0 ± 0.5 μm, produced by Soken Chemical & Engineering Co., Ltd.) | |
| Tolene | 205 parts |

[Composition of the base coating material]
Acrylic type compound

| | |
|---|---|
| Tripentaerythritol polyacrylate | 45 parts |
| Epoxy type compound | 45 parts |
| (Trade name: Cyracure UVR-6110, produced by Union Carbide Corp.) | |
| Photo-cationic polymerization initiator | 2 parts |
| (Trade name: Cyracure UVI-6990, produced by Union Carbide Corp.) | |
| Isopropyl alcohol | 5 parts |

Example 11

An anti-reflection material according to the present invention having a surface-roughened layer with a thickness of 3.8 μm and refractive index of 1.54 was obtained in a manner similar to that of Example 9, with the exception that the composition of the surface-roughened layer was replaced with the following composition. The critical surface tension of the surface layer was 42 dyne/cm. The anti-reflection material had a HAZE value of 18 and a reflectance of 1.2%.

[Composition of the dispersion liquid]
Crosslinking acrylic beads

| | |
|---|---|
| (Trade name: MX 150, particle size 1.5 ± 0.5 μm, produced by Soken Chemical & Engineering Co., Ltd.) | 5 parts |
| (Trade name: MX 300, particle size 3.0 ± 0.5 μm, produced by Soken Chemical & Engineering Co., Ltd.) | 5 parts |
| Toluene | 210 parts |

[Composition of the base coating material]
Acrylic type compound

| | |
|---|---|
| Tetradipentaerythritol polyacrylate | 15 parts |
| Neopentyl glycol diacrylate | 30 parts |
| Epoxy type compound | 45 parts |
| (Trade name: Epikote 828, produced by Yuka Shell Epoxy, Inc.) | |
| Photo-cationic polymerization initiator | 2 parts |
| (Trade name: Cyracure UVI-6990, produced by Union Carbide Corp.) | |
| Isopropyl alcohol | 5 parts |

Example 12

An anti-reflection material according to the present invention having a surface-roughened layer with a thickness of 3.8 μm and refractive index of 1.54 was obtained in a manner similar to that of Example 10, with the exception that the composition of the surface-roughened layer was replaced with the following composition. The critical surface tension of the surface layer was 42 dyne/cm. The anti-reflection material had a HAZE value of 6 and a reflectance of 1.9%.

[Composition of the dispersion liquid]
Crosslinking acrylic beads

| | |
|---|---|
| (Trade name: MX 150, particle size 1.5 ± 0.5 μm, produced by Soken Chemical & Engineering Co., Ltd.) | 3 parts |
| (Trade name: MX 300, particle size 3.0 ± 0.5 μm, produced by Soken Chemical & Engineering Co., Ltd.) | 3 parts |
| Toluene | 210 parts |

[Composition of the base coating material]
Acrylic type compound

| | |
|---|---|
| Dipentaerythritol polyacrylate | 15 parts |
| Tripentaerythritol polyacrylate | 30 parts |
| Epoxy type compound | 45 parts |
| (Trade name: Rapi-Cure DVE-3, produced by ISP, Corp.) | |
| Photo-cationic polymerization initiator | 2 parts |
| (Trade name: BBI-102, produced by Midori Kagaku Co., Ltd.) | |
| Isopropyl alcohol | 5 parts |

Example 13

An anti-reflection material according to the present invention having a surface-roughened layer with a thickness of 2.5 μm and a refractive index of 1.53 was obtained in a manner similar to that of Example 9, with the exception that the composition of the surface-roughened layer was replaced with the following composition. The critical surface tension of the surface layer was 45 dyne/cm. The anti-reflection material had a HAZE value of 7 and reflectance of 1.9%.

| [Composition of the dispersion liquid] | |
|---|---|
| Crosslinking acrylic beads | 3 parts |
| (Trade name: MX 300, particle size 3.0 ± 0.5 μm, produced by Soken Chemical & Engineering Co., Ltd.) | |
| Toluene | 210 parts |
| [Composition of the base coating material] | |
| Acrylic type compound | |
| 1,6-Hexanediol dimethacrylate | 20 parts |
| Pentaerythritol triacrylate hexamethylene diisocyanate | 30 parts |
| Epoxy type compound | 45 parts |
| (Trade name: Epolight 40E, produced by Kyoei Chemical Corporation) | |
| Photo-cationic polymerization initiator | 2 parts |
| (Trade name: MPI03, produced by Midori Kagaku Co., Ltd.) | |
| Isopropyl alcohol | 5 parts |

Comparative Example 1

A comparative anti-reflection material was obtained in a manner similar to that of Example 1, with the exception that the compositions of the dispersion liquid and the base coating material were replaced with the following compositions. The surface-roughened layer had a thickness of 3.2 μm and a refractive index of 1.52, without any surface layer. The comparative anti-reflection material had a HAZE value of 13 and a reflectance of 2.6%. The critical surface tension of the surface was 30 dyne/cm.

| [Composition of the dispersion liquid] | |
|---|---|
| Crosslinking acrylic beads | 5 parts |
| (Trade name: MX 300, particle size 3.0 ± 0.5 μm, produced by Soken Chemical & Engineering Co., Ltd.) | |
| Toluene | 200 parts |
| [Composition of the base coating material] | |
| Acrylic type compound | |
| 1,6-Hexanediol dimethacrylate | 45 parts |
| Pentaerythritol triacrylate hexamethylene diisocyanate | 45 parts |
| Photo polymerization initiator | 5 parts |
| (Trade name: Irgacure 184, produced by CIBA-GEIGY AG.) | |
| Isopropyl alcohol | 10 parts |

Comparative Example 2

A comparative anti-reflection material was a triacetyl cellulose having a thickness of 80 μm and 92% of light transmittance. The critical surface tension of the surface was 36 dyne/cm.

Comparative Example 3

A comparative anti-reflection material having a critical surface tension of a surface layer of 25 dyne/cm was obtained in a manner similar to that of Example 1, with the exception that the compositions of the dispersion liquid and the base coating material were replaced with the compositions shown in the following. The thickness and refractive index of the surface-roughened layer were 3.0 μm and 1.53, respectively. The HAZE value and reflectance of the comparative anti-reflection material were 2 and 2.0%, respectively.

| [Composition of the dispersion liquid] | |
|---|---|
| Crosslinking acrylic beads | 2 parts |
| (Trade name: MX 300, particle size 3.0 ± 0.5 μm, produced by Soken Chemical & Engineering Co., Ltd.) | |
| Toluene | 100 parts |
| [Composition of the base coating material] | |
| Polyester type thermoplastic resin | 40 parts |
| (Trade name: Vylon 200, produced by Toyobo Corporation) | |
| Toluene | 70 parts |
| MEK | 100 parts |

Comparative Example 4

A comparative anti-reflection material having a surface-roughened layer with a thickness of 3.6 μm and a refractive index of 1.51 was obtained in a manner similar to that of Example 9, with the exception that the composition of the surface-roughened layer was replaced with the following composition. The critical surface tension of the surface layer was 45 dyne/cm. The comparative anti-reflection material had a HAZE value of 5 and a reflectance of 1.9%.

| [Composition of the dispersion liquid] | |
|---|---|
| Crosslinking acrylic beads | 3 parts |
| (Trade name MX 300, particle size 3.0 ± 0.5 μm, produced by Soken Chemical & Engineering Co., Ltd.) | |
| Toluene | 200 parts |
| [Composition of the base coating material] | |
| Acrylic type compound | |
| Dipentaerythritol polyacrylate | 50 parts |
| Pentaerythritol tetraacrylate | 20 parts |
| Hydroxy ethyl acrylate | 22 parts |
| Radical-type photo-polymerization initiator | 5 parts |
| (Trade name: Irgacure 184, produced by CIBA-GEIGY AG.) | |
| Isopropyl alcohol | 50 parts |

Comparative Example 5

A comparative anti-reflection material having a surface-roughened layer with a thickness of 4.2 μm and a refractive index of 1.53 was obtained in a manner similar to that of Example 9, with the exception that the composition of the surface-roughened layer was replaced with the following composition. The critical surface tension of the surface layer was 40 dyne/cm. The comparative anti-reflection material had a HAZE value of 18 and a reflectance of 1.4%

| [Composition of the dispersion liquid] | |
|---|---|
| Crosslinking acrylic beads | 6 parts |
| (Trade name: MR-7G, produced by Soken Chemical & Engineering Co., Ltd., | |
| particle size: 0.5 to 6.0 μm | 60% by weight |
| particle size: exceed 6.0 μm | 25% by weight) |
| Toluene | 210 parts |
| [Composition of the base coating material] | |
| Acrylic type compound | 42 parts |
| Dipentaerythritol triacrylate | |

| | |
|---|---|
| Trimethylolpropane triacrylate | 42 parts |
| Photo-cationic polymerization initiator represented by the following formula: | 10 parts |

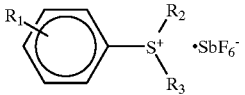

| | |
|---|---|
| Isopropyl alcohol | 5 parts |

Comparative Example 6

A comparative anti-reflection material having a surface-roughened layer with a thickness of 3.0 µm and a refractive index of 1.53 was obtained in a manner similar to that of Example 9, with the exception that the composition of the surface-roughened layer was replaced with the following composition. The critical surface tension of the surface layer was 40 dyne/cm. The comparative anti-reflection material had a HAZE value of 13 and a reflectance of 1.4%

| | |
|---|---|
| [Composition of the dispersion liquid] | |
| Crosslinking acrylic beads (Trade name: MX300, particle size 3.0 µm ± 0.5 produced by Soken Chemical & Engineering Co., Ltd.) | 2 parts |
| Toluene | 100 parts |
| [Composition of the base coating material] | |
| Polyester-type thermoplastic resin (Trade name: Vylon 200, produced by Toyobo Corporation) | 40 parts |
| Toluene | 70 part |
| MEK | 100 parts |

The polarizing film (20) having a construction shown in FIG. 2 was produced using one of the anti-reflection materials (10) and comparative anti-reflection materials (10). Subsequently, the polarizing film (20) was adhered to the glass substrate (33) as shown in FIG. 3 to produce a liquid crystal display (30). In addition, with regard to the anti-reflection material (10) obtained in Example 6, a laminate wherein the PET surface is adhered to the polarizing film on which a surface-roughening treatment was not carried out, via an adhesion agent was prepared, and the thus obtained laminate was adhered to the glass substrate (43), as shown in FIG. 4, to obtain a liquid crystal display (40).

In addition, with regard to the anti-reflection material (10) obtained in Example 12 and the comparative anti-reflection material (10) obtained in Comparative Example 2, a laminate wherein the surface of the saponified TAC is adhered to the polarizing film, on which a surface-roughening treatment was not carried out, via an adhesion agent was prepared, and the thus obtained laminate was adhered to the glass substrate (43), as shown in FIG. 4, to obtain a liquid crystal display (40).

In addition, a laminate was produced in the same manner as described in Example 9 with the exception that a non-saponified TAC was coated on a polarization substrate made of PVA, a surface-roughened layer having the same composition as described in Example 9 was coated thereon, and subsequently the TAC was saponified by means of an alkaline treatment. Subsequently, a liquid crystal display (40) was prepared in the same manner as described above, using the laminate. This laminate is designated as Example 14.

The image size of each liquid crystal display (30 and 40) was set to for example, 10.4 inches. The image contrast was evaluated according to the following methods, on the condition of the resonance being set to for example, 800×600 dots.

With regard to the anti-reflection materials (10) obtained in Examples 1 to 14 and the comparative anti-reflection materials (10) obtained in Comparative Examples 1 to 6, anti-glarability, image glittering, reflectance, wear resistance, chemical resistance, critical surface tension, and stain resistance were measured and evaluated by the following methods.

Anti-glarability was measured on a transmission mode, with an optical comb width of 2 mm, using an image clarity measuring apparatus, ICM-1DP (JIS K7105), produced by Suga Testing Machine Corporation. The smaller the measured values are, the higher anti-glarability was. In this evaluation, the criteria was set as follows: less than 50%: ○, 50% or more and less than 70%: Δ, and 70% or more: X.

Image glittering was measured on a transmission mode, with an optical comb width of 0.125 mm, using the same apparatus as that in the anti-glarability measurement. The larger the measured values are, the less the image glittering was. In this evaluation, the criteria was set as follows: 10% or more: ○, 5% or more and less than 10%: Δ, and less than 5%: X.

With regard to reflectance, a regular reflection at 5° was measured with a wave length ranging from 400 nm to 700 nm, using a spectrophotometer UV 3100 (produced by Shimazu Seisakusho Corporation), and was shown as Y value wherein a visibility was corrected. The measurement was carried out after the non-measured face was completely black-finished using a black magic ink.

With regard to wear resistance, a steel wool #0000 produced by Nihon Steel Wool Corporation was set in a plated-paper wear resistance tester (produced by Kumagaya Riki Industry Corporation), the surface layer of the anti-reflection material was reciprocated at 50 times under 200 g of load, and subsequently, the change of the HAZE value, δ H (according to the expression in the following) of the part was measured using a HAZE meter produced by Toyo Seiki Corporation. The larger the measured values are, the inferior wear resistance was. The measurement of the HAZE value was carried out using a simple substance of the anti-reflection material.

Change of HAZE value, δ H=HAZE value after testing −HAZE value before testing

With regard to chemical resistance, the surface layer was rubbed using a cotton swab (produced by Johnson and Johnson, Inc.) containing isopropyl alcohol with 50 reciprocations, and subsequently, chemical resistance was evaluated with the criteria set as follows: a case where an extreme change such as peeling-off of the surface-roughened layer was observed: X, a case where no changes were observed: ○, and the intermediate case: Δ.

Critical surface tension was calculated as follows: A contact angle with respect to methylene iodide and water on the surface layer of the anti-reflection material was measured according to a Will Hermy method. The measured contact angle was substituted in the following expression described in "Base Science of Coating" (Yuji Harasaki, published by Maki Shoten), pp. 170 and 171. The critical surface tension was calculated from the $\gamma LV°$ value extrapolated in COS $\theta-1$, using Zismam plotting.

$$COS\theta = 1 + b(\gamma_c - \gamma_{LV°})$$

with the proviso that $\gamma_{LV°} \geqq \gamma_c$ wherein $\theta$: contact angle of solid/liquid, $\gamma_{LV°}$: surface tension of liquid, $\gamma c$: critical surface tension, and b: constant.

With regard to stain resistance, after a drop of rapeseed oil was dropped on the surface layer, the dropped rapeseed oil was rubbed with 20 reciprocations using Bencott produced by Ashahi Kasei Corporation containing ligroin. After that, an SEM photograph was taken of the the wiped surface, and subsequently the existence of cracks on the surface or adhesion of fibers of the Bencott was observed. The stain resistance was evaluated by a criteria as follows: a case where the existence of cracks on the surface or adhesion of the fiber of the Bencott was extremely observed: X, a case where there were no changes: ○, and the intermediate case: Δ.

Figure 5:
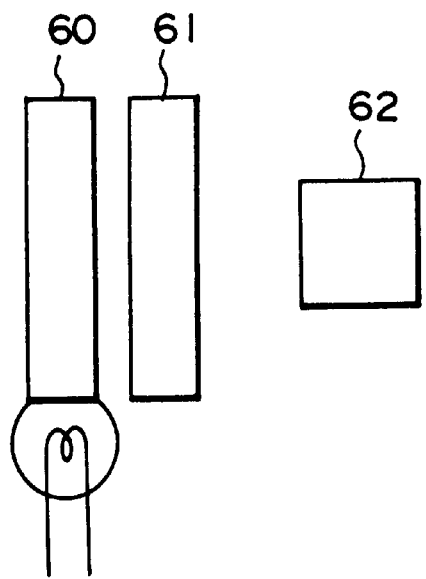
FIG. 5 is a schematic view showing an arrangement drawing of an apparatus for measuring image contrast.

Image contrast was evaluated according to a contrast ratio (CR) measuring method of a liquid crystal display panel in JIS C7072 1988. In the evaluation of image contrast, the arrangement of a light source (60)—liquid crystal panel (61)—measuring apparatus (62) is shown in FIG. 5. In this case, the distance between the light source (60) and the liquid crystal panel (61) was set at, for example, 1 cm, the distance between the liquid crystal panel (61) and the measuring apparatus (62) was set at, for example, 50 cm, and an angular aperture of the measuring apparatus was set at for example, 5°. As the light source, EL of 5W was employed, and as the measuring apparatus, LS-100 produced by Minolta Camera Corporation was employed. Image contrast was evaluated according to a criteria as follow: CR=4 or more: ⊙, CR=3 or more and less than 4: ○, CR=2 or more and less than 3: Δ, and CR=less than 2: X.

In addition, adhesion between the transparent substrate and the surface-roughened layer was observed according to a criteria as follows: a case wherein adhesion between the transparent substrate and the surface-roughened layer was observed: ○, and a case wherein adhesion between the transparent substrate and the surface-roughened layer was not observed: X. The results of the above tests are shown in Table 1.

TABLE 1

| Sample | Critical Surface Tension (dyne/cm) | HAZE Value | Reflectance | Image Contrast | Image Glittering | Anti-glarability | Adherence | Wear Resistance | Chemical Resistance | Stain Resistance |
|---|---|---|---|---|---|---|---|---|---|---|
| Example 1 | 11 | 11 | 1.4 | ⊙ | ○ | ○ | ○ | 3 | ○ | ○ |
| Example 2 | 11 | 22 | 1.3 | ○ | ○ | ○ | ○ | 2 | ○ | ○ |
| Example 3 | 11 | 22 | 1.3 | ○ | ○ | ○ | ○ | 1 | ○ | ○ |
| Example 4 | 18 | 11 | 1.6 | ○ | ○ | ○ | ○ | 1 | ○ | ○ |
| Example 5 | 15 | 28 | 1.0 | ○ | ○ | ○ | ○ | 1 | ○ | ○ |
| Example 6 | 11 | 9 | 1.4 | ⊙ | ○ | ○ | ○ | 1 | ○ | ○ |
| Example 7 | 22 | 35 | 0.9 | Δ | ○ | ○ | ○ | 6 | Δ | Δ |
| Example 8 | 42 | 11 | 1.3 | ○ | ○ | ○ | ○ | 2 | ○ | Δ |
| Example 9 | 40 | 10 | 1.4 | ○ | ○ | ○ | ○ | 1 | ○ | Δ |
| Example 10 | 41 | 20 | 1.2 | ○ | ○ | ○ | ○ | 2 | ○ | Δ |
| Example 11 | 42 | 18 | 1.2 | ⊙ | ○ | ○ | ○ | 2 | ○ | Δ |
| Example 12 | 42 | 6 | 1.9 | ⊙ | ○ | ○ | ○ | 1 | ○ | Δ |
| Example 13 | 45 | 7 | 1.9 | ⊙ | ○ | ○ | ○ | 1 | ○ | Δ |
| Example 14 | 38 | 13 | 2.5 | ○ | Δ | Δ | ○ | 1 | Δ | Δ |
| Comparative Example 1 | 30 | 13 | 2.6 | Δ | ○ | ○ | ○ | 3 | ○ | X |
| Comparative Example 2 | 36 | 0.3 | 4.3 | ⊙ | ○ | X | — | 48 | ○ | X |
| Comparative Example 3 | 25 | 2 | 2.0 | ○ | X | Δ | ○ | 46 | X | Δ |
| Comparative Example 4 | 45 | 5 | 1.9 | ○ | Δ | ○ | X | 10 | ○ | Δ |
| Comparative Example 5 | 40 | 18 | 1.3 | ○ | X | ○ | X | 6 | X | Δ |
| Comparative Example 6 | 40 | 13 | 1.4 | ○ | ○ | ○ | X | 38 | X | Δ |

As is apparent from the results shown in Table 1, the anti-reflection materials according to the present invention exhibit excellent properties. Especially, Examples 1 to 6 exhibit excellent stain resistance since these anti-reflection materials have a critical surface tension of 20 dyne/cm or less. On the other hand, the comparative anti-reflection material according to Comparative Example 2 does not have a surface-roughened layer and a surface layer, and for this reason, it has problems in anti-glarability and wear resistance. Furthermore, the comparative anti-reflection material according to Comparative Example 3 has the surface-roughened layer of a thermoplastic resin instead of a curable resin, and for this reason, wear resistance and chemical resistance are degraded.

Furthermore, as is apparent from the results shown in Table 1, the anti-reflection materials of Examples 9 to 14 according to the present invention with the transparent substrate consisting of a saponified TAC and the surface-roughened layer comprising an epoxy compound and a photo-cationic polymerization initiator exhibit excellent adhesion between the transparent substrate and the surface-roughened layer, and good optical properties and wear resistance. On the other hand, in the comparative anti-reflection materials according to Comparative Examples 4 to 6, the surface-roughened layer was peeled off from the transparent substrate consisting of saponified TAC due to degraded adhesion thereof, and wear resistance could not be obtained, since the comparative materials did not have UV-curing resin as shown in Examples of the present invention in the surface-roughened layer. Since the dispersion of the filler was bad, the comparative materials had a problem in glittering (see Comparative Examples 4 and 5), and had a problem in chemical resistance (see Comparative Examples 5 and 6). With regard to the material of Example 14, image glittering, anti-glarability, and chemical resistance were slightly insufficient. It is considered that this result of Example 14 was due to the adhesion between the substrate and the surface-roughened layer and wear resistance being slightly degraded since a saponification treatment was carried out after the surface-roughened layer was formed on TAC.

As explained above, according to the present invention, an anti-reflection material and a polarizing film which exhibit excellent anti-reflection properties by means of preventing the outside lights such as sun light, fluorescent lamp, and the like from reflecting on a display, which give a clear image without glittering and reduction of image contrast, and, which exhibit excellent wear resistance, chemical resistance, and optical stability with excellent adhesion between the surface-roughened layer and the substrate, can be provided.

What is claimed is:

1. An anti-reflection material comprising a transparent substrate, a surface-roughened layer provided on at least one surface of the transparent substrate, and a surface layer provided on said surface-roughened layer, wherein said surface-roughened layer comprises an ultraviolet-curing resin comprising at least an epoxy compound and a photo-cationic polymerization inhibitor, and said surface layer has a critical surface tension of 20 dyne/cm or less.

2. An anti-reflection material as recited in claim 1, wherein said surface-roughened layer comprises a spheroidal filler, which has a particle size distribution wherein particles having a particle size D of said spheroidal filler in a range of 0.5 $\mu$m$\leq$D$\leq$6.0 $\mu$m are present in an amount of 60% by weight or more, particles having a particle size D in a range of 6.0 $\mu$m<D$\leq$10.0 $\mu$m are present in an amount of less than 20% by weight, particles having a particle size D in a range of 10.0 $\mu$m<D$\leq$15.0 $\mu$m are present in an amount of less than 5% by weight, and particles having a particle size D of larger than 15 $\mu$m are present in an amount of 1.0% by weight or less.

3. An anti-reflection material as recited in claim 1, wherein said transparent substrate consists of a saponified triacetyl cellulose.

4. A polarizing film wherein a protecting layer is laminated on the opposite side of the surface of said transparent substrate of the anti-reflection material as recited in claim 1, wherein said surface-roughened layer is provided, via a polariztion substrate.

5. A method for producing an anti-reflection material comprising the steps of:

forming a transparent substrate in a form of a sheet using a saponified triacetyl cellulose;

providing a surface-roughened layer containing an ultra-violet-curing resin on at least one surface of said transparent substrate, wherein said ultra-violet-curing resin comprises at least an epoxy compound and a photo-cationic initiator; and providing a surface layer on said surface-roughened layer.

* * * * *